United States Patent [19]

Kim

[11] Patent Number: 5,590,949
[45] Date of Patent: Jan. 7, 1997

[54] DETACHABLE FRONT PANEL FOR CAR STEREOS

[76] Inventor: Jeong-Eu Kim, 113 Yang-dong, Kwangchoo Kwangyuk-shi, 506-455, Rep. of Korea

[21] Appl. No.: 549,151

[22] Filed: Oct. 27, 1995

[30] Foreign Application Priority Data

Sep. 4, 1995 [KR] Rep. of Korea .................. 95-23927

[51] Int. Cl.⁶ ..................................................... H04S 7/00
[52] U.S. Cl. ........................... 362/86; 362/157; 362/253; 362/800; 455/346
[58] Field of Search ................................ 362/86, 85, 191, 362/157, 234, 253, 800; 455/346

[56] References Cited

U.S. PATENT DOCUMENTS

| | | | |
|---|---|---|---|
| 4,625,263 | 11/1986 | Strohmeier | 362/86 X |
| 5,341,434 | 8/1994 | Kawamoto | 455/346 X |
| 5,517,345 | 5/1996 | Joaille | 455/346 X |

*Primary Examiner*—Stephen F. Husar
*Attorney, Agent, or Firm*—Watson Cole Stevens Davis, P.L.L.C.

[57] ABSTRACT

A structurally improved detachable front panel for car stereos is disclosed. The panel is detachably mounted to the fixed main body of a car stereo and has an improved structure suitable to make the panel be selectively used as an emergency lamp. The panel has lighting means, switching means for turning on or off the lighting means, and power supplying means for supplying electric power for the lighting means. A panel casing receives the front panel separated from the stereo's main body and has a means for directly operating the switching means of the panel at the outside of the casing so as to turn on or off the lighting means when using the panel as a lamp.

2 Claims, 4 Drawing Sheets

DETACHABLE FRONT PANEL FOR CAR STEREOS

BACKGROUND OF THE INVENTION

1. Field of the Invention

The present invention relates in general to a detachable front panel for car stereos, having a plurality of control buttons and displaying means and being detachably mounted to the front of a fixed main body of a car stereo, and, more particularly, to a structural improvement in such a detachable front panel for improving the practicality of the front panel and thereby being convenient to the users.

2. Description of the Prior Art

Car stereos are the audio systems set in the dashboards of an automobile. Most typical car stereos set in the dashboards are integrated types of stereo systems in which the main body of each stereo is integrated with the front panel into a single body. As car stereos are expensive equipment, thieves often break into the cars and yank out the stereos. Particularly, the integrated type of car stereos are noted to be stolen more easily by thieves.

In an effort to prevent the car stereos from being stolen, a car stereo having a detachable front panel has been proposed. In this type of car stereo, the main body of the stereo is fixedly set in the dashboard of the car, while the front panel is detachably mounted to the front of the fixed main body. When the front panel is mounted to the main body, the control means of the front panel is electrically connected to the parts of the main body thereby allowing the user to control the main body. In order to prevent the above car stereo from being stolen while the user is away from the car, the front panel is separated from the main body and carried by the user.

The above type of car stereo can be effectively prevented from being stolen by a thief as the front panel can be separated from the fixed main body of the stereo and carried by the user while the user is away from the car.

SUMMARY OF THE INVENTION

It is an object of the present invention to provide a detachable front panel for car stereos which is detachably mounted to the fixed main body of a stereo and has an improved structure suitable to make the panel be selectively used as an emergency lamp, thereby improving the practicality of the panel and being convenient to the users.

It is another object of the present invention to provide a compact panel casing which fittingly receives the front panel separated from the stereo's main body and directly handles the switching means of the panel at the outside of the casing so as to turn on or off the lighting means when using the panel as a lamp.

In order to accomplish the above object, the present invention provides a front panel detachably mounted to the front of a car stereo's main body, comprising: lighting means, switching means for turning on or off the lighting means, and power supplying means for supplying electric power for the lighting means, the above lighting means, switching means and power supplying means being appropriately arranged in the front panel to form a flash.

The present invention also provides a panel casing which receives the front panel separated from the stereo's main body and directly handles the switching means of the panel at the outside of the casing so as to turn on or off the lighting means when using the panel as an emergency lamp.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
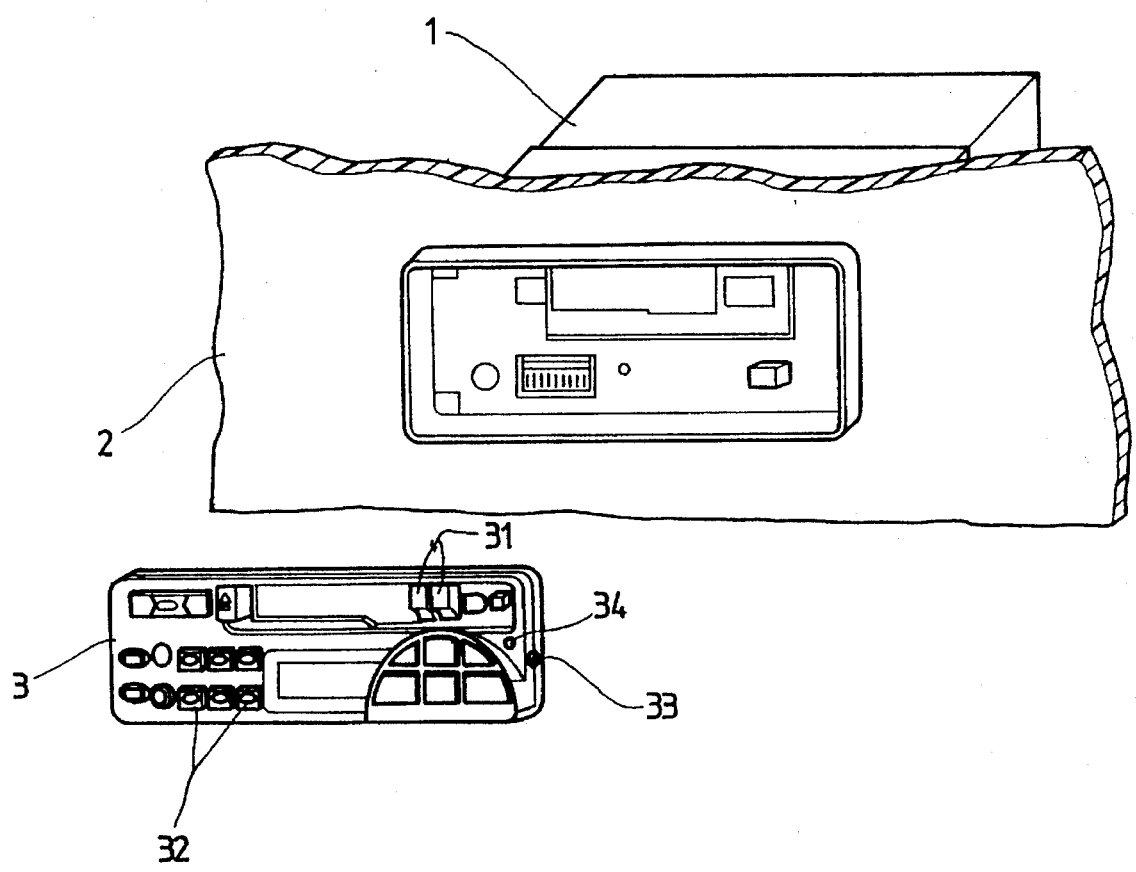
FIG. 1 is an exploded perspective view of a front panel for car stereos in accordance with a preferred embodiment of the present invention.

FIG. 1 is an exploded perspective view of a front panel for car stereos in accordance with a preferred embodiment of the present invention. In this drawing, the reference symbol 1 denotes a typical main body of a car stereo, and 2 denotes a dashboard where the main body is set, and 3 denotes the detachable front panel.

The front panel 3 is detachably mounted to the front of the main body 1 in the same manner as a conventional detachable front panel. The panel 3 also is provided with various control means such as control buttons 31 and 32. When the front panel 3 is mounted to the front of the main body 1, the control means 31, 32 of the panel 3 is electrically connected to the main body 1, thereby controlling the stereo from outside the panel 3.

Figure 2:
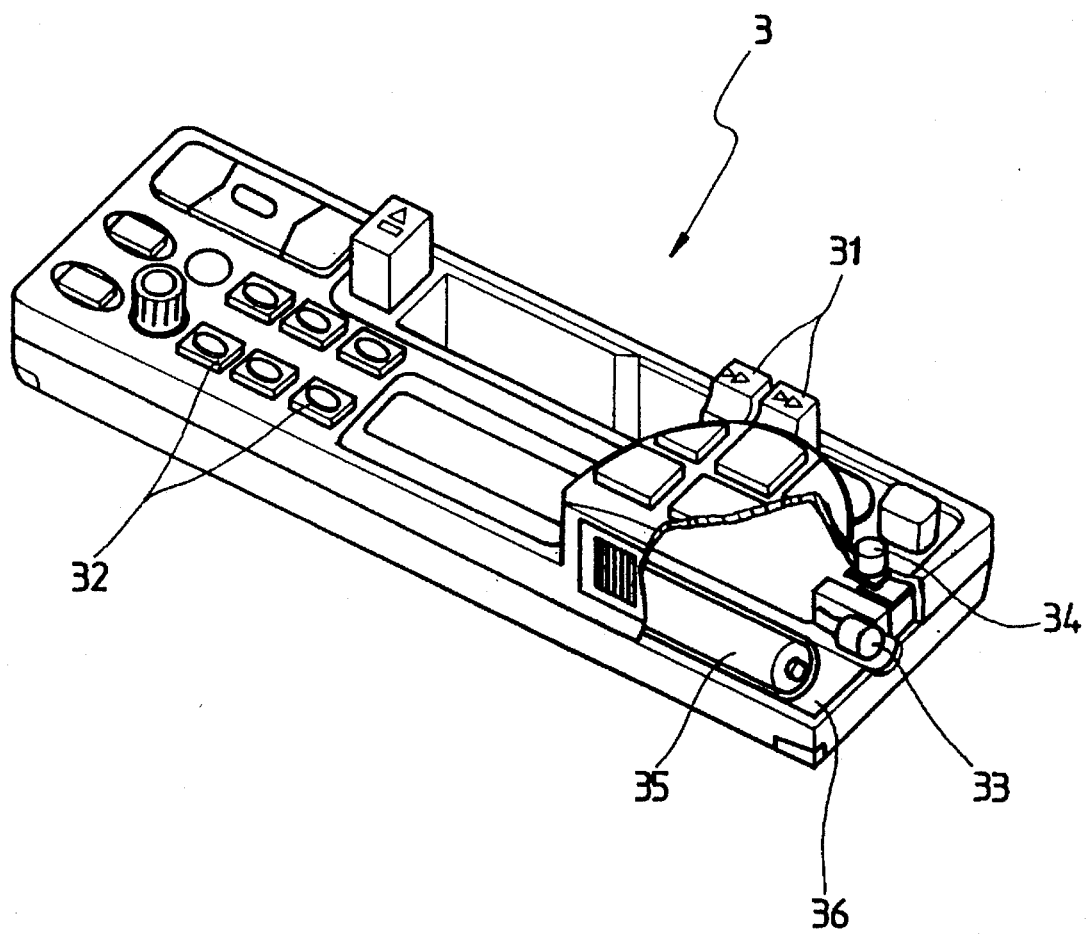
FIG. 2 is a partially broken perspective view showing the construction of the front panel of FIG. 1.

In accordance with the present invention, the detachable panel 3 also includes lighting means 33 and switching means 34 for turning on or off the lighting means 33. Both the lighting means 33 and the switching means 34 are set in appropriate positions of the panel 3, respectively. In the preferred embodiment of FIG. 1, the switching means 34 is comprised of a switching knob. An example of the positions of both the lighting means 33 and the switching means 34 is shown in FIG. 1. As shown in FIG. 2, the panel 3 further includes power supplying means 35 for supplying the electric power for the lighting means 33. In the preferred embodiment of this invention, the power supplying means 35 is comprised of a battery installed in a battery chamber 36.

In the present invention, the lighting means 33 may be a typical small lamp or light emit diode (LED).

The battery as the power supplying means 35 may be preferably selected from any typical batteries including a rechargeable battery.

Of course, it should be understood that both the positions and the configurations of the lighting means 33, switching means 34 and battery chamber 36 of the panel 3 are not limited to those shown in the drawings, but can be changed in accordance with designing conditions of the panel 3.

Figure 3:
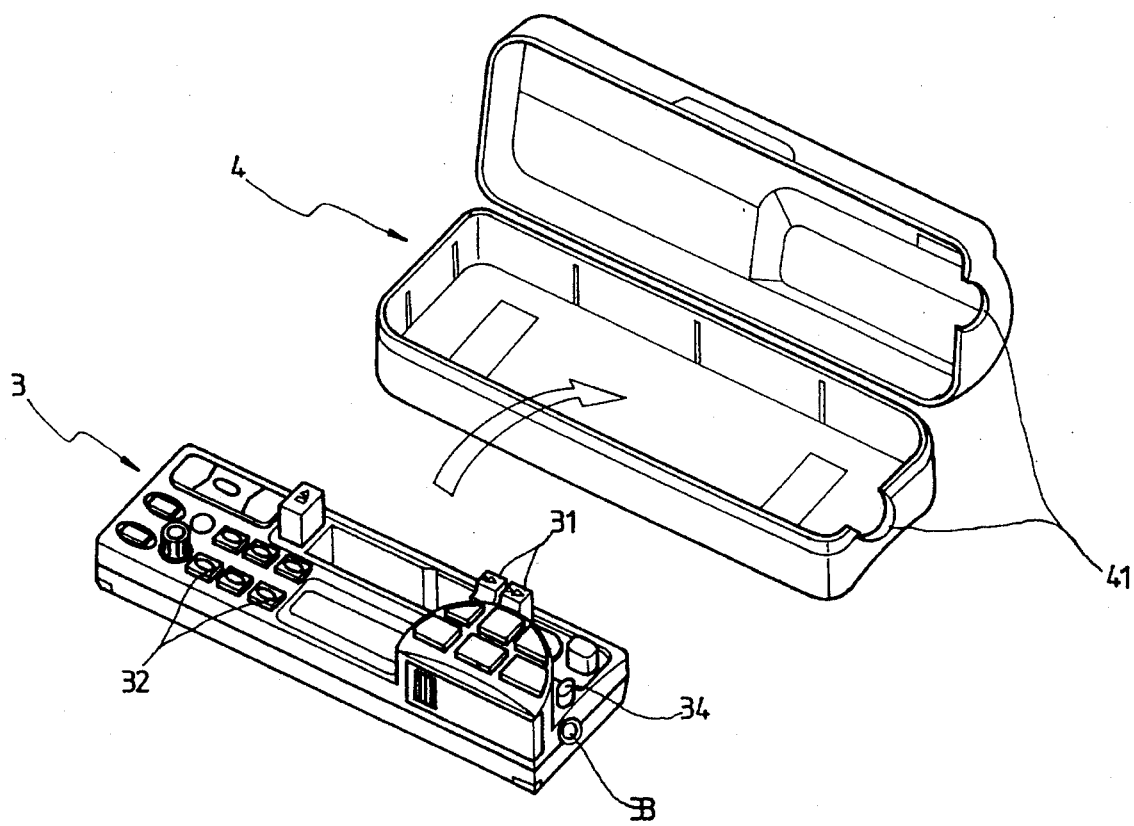
FIG. 3 is a perspective view showing the above front panel and a panel casing for receiving the front panel therein.
Figure 4:
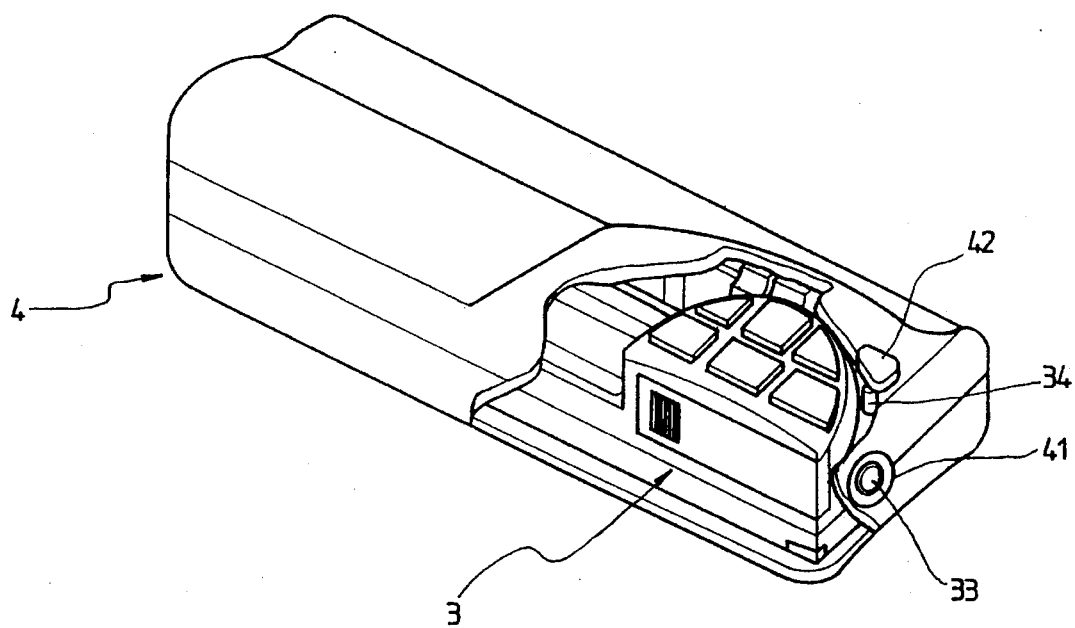
FIG. 4 is a partially broken perspective view of the above panel casing with the front panel received in the casing.

FIGS. 3 and 4 show a panel casing 4 for receiving the panel 3 separated from the fixed main body 1. The casing 4 has a compact size and configuration suitable to fittingly receive the panel 3 therein. In order to allow the light emitted from the lighting means 33 to pass the casing 4 when the panel 3 is received in the casing 4 with the closed lid, the casing 4 has an opening 41. The casing 4 also includes a push button 42 for operating the switching knob 34 of the panel 3, thereby turning on or off the lighting means 33 at the outside of the casing 4.

As described above, the present invention provides a detachable front panel for car stereos which is detachably mounted to the fixed main body of a car stereo. The detachable front panel can be separated from the fixed main body and can be carried by the user when the user is away from the car, thereby preventing the car stereo from being stolen by a thief. The above panel also is provided with a lamp function. That is, the panel has lighting means, switching means for turning on or off the lighting means, and power supplying means for supplying electric power to the lighting means. With the above lamp function, the front panel may be selectively used as an emergency lamp when the panel is separated from the fixed main body of the stereo and carried by the user. Therefore, the front panel of this invention improves the practicality of the detachable front panel for car stereos and is convenient to the users.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A front panel for car stereos, detachably mounted to the front of a stereo's main body fixedly set in a dashboard of a car and including control means electrically connected to said main body to control the car stereo, further comprising:

means for lighting by electric power applied thereto from power supplying means, thereby allowing said panel to be selectively used as a lamp when said panel is separated from the fixed main body, said lighting means being set in a side of the panel; and switching means for turning on or off said lighting means.

2. The front panel according to claim 1, wherein said panel is received in a casing when the panel is separated from the fixed main body and carried by a user, said casing including:

an opening for allowing the light emitted from said lighting means to pass the casing; and means for operating said switching means of the panel at the outside of the casing to turn on or off the lighting means.

\* \* \* \* \*